UNITED STATES PATENT OFFICE.

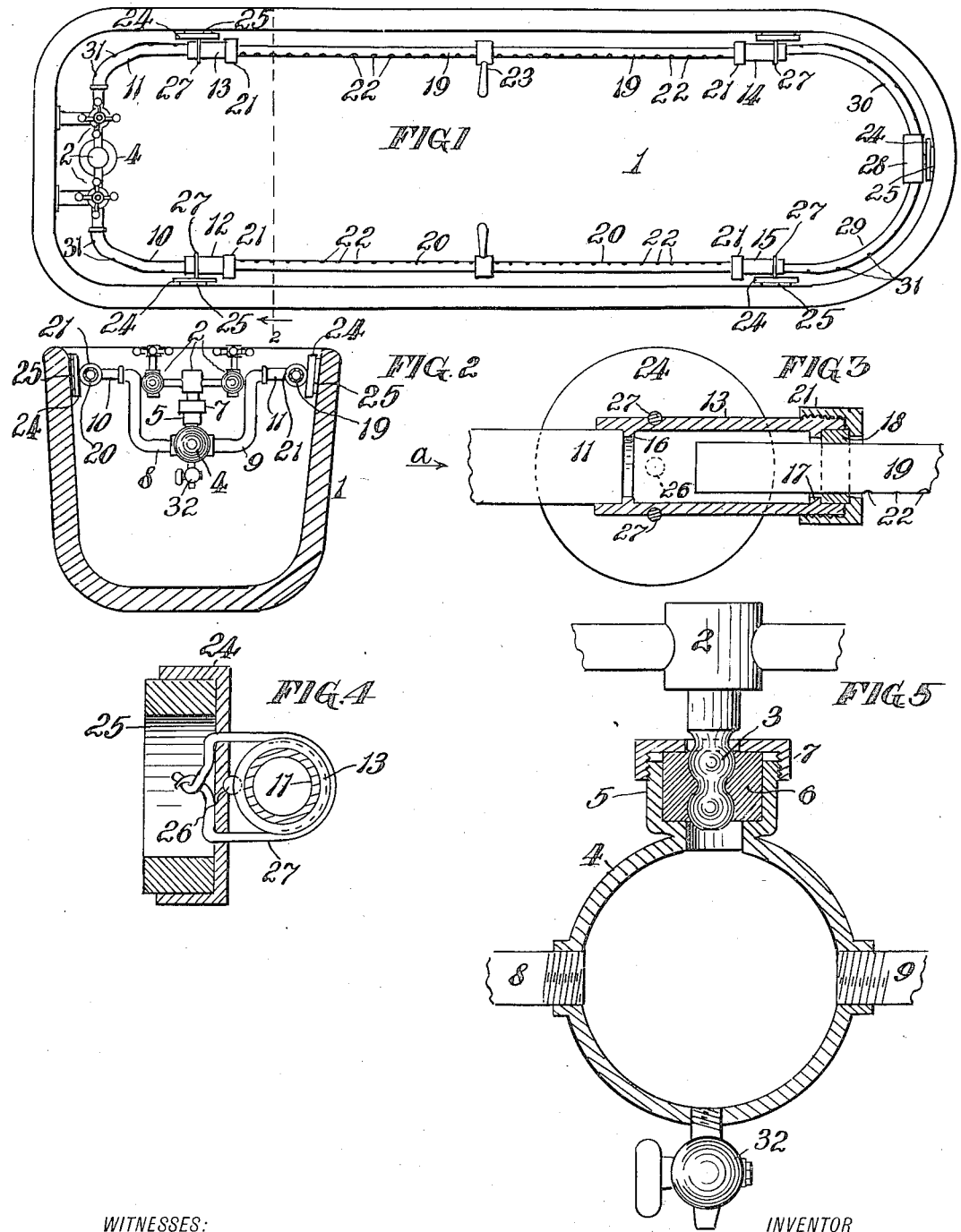
H. BARNES.
SPRAYING ATTACHMENT FOR BATH TUBS.
APPLICATION FILED JULY 10, 1914.
1,140,347.
Patented May 25, 1915.

HENRY BARNES, OF BROOKLYN, NEW YORK.

SPRAYING ATTACHMENT FOR BATH-TUBS.

1,140,347.                Specification of Letters Patent.     Patented May 25, 1915.

Application filed July 10, 1914. Serial No. 850,090.

*To all whom it may concern:*

Be it known that I, HENRY BARNES, citizen of the United States, residing at Brooklyn, in the county of Kings and State of New York, have invented certain new and useful Improvements in Spraying Attachments for Bath-Tubs; and I do hereby declare the following to be a full, clear, and exact description of the invention, such as will enable others skilled in the art to which it appertains to make and use the same.

My invention relates to an improved spraying attachment for bath tubs, and it consists in certain details of construction to be more fully set forth in the following specification.

Referring to the drawings wherein the same figures of reference indicate like parts throughout the several views: Figure 1 indicates an upper plan view of a bath tub with my improved spraying attachment connected therewith; Fig. 2 indicates a cross sectional view on line 2 of Fig. 1; Fig. 3 indicates an enlarged rear elevation of one of the holding pads, sectional view of one of the pipe supporting housings or bearings, and means for attaching the housing to the pad cups, and broken view of the pipes; Fig. 4 indicates an enlarged central sectional view of one of the pads, end elevation of one of the pipe supporting housings, and sectional view of one of the pipes looking in the direction of arrow *a* of Fig. 3; and Fig. 5 is an enlarged central sectional view of the water mixing and distributing bulb, broken view of the pipes connected therewith, and means for attaching the bulb to the bib nipple.

One of the objects of my invention is to dispense with the usual unsightly spray pipe supporting brackets, which limit the pipes to a certain position, and to substitute therefor holding pads adapted to firmly bear against the inner walls of the tub and adapted to be adjusted to any position desired.

The tub 1 is provided with the usual Siamese faucet 2 having the bib nipple 3, Fig. 5, to which the water distributing bulb 4 is detachably connected as follows: The cup-shaped extension 5 of the bulb holds the rubber packing washer 6 having a central hole adapted to embrace the bib nipple 3. 7 is a threaded cap embracing the threaded end of the cup and bearing on the outer end of the washer 6. The pressure of the cap on the washer will tend to force said washer firmly against the bib nipple. By this arrangement, the bulb may be readily and quickly attached to any of the various sizes and styles of bibs with which different bath tubs are equipped.

Angularly shaped branch pipes 8 and 9 are secured to the bulb, and to the outer ends of these pipes are secured the pipes 10 and 11. The outer ends of these latter pipes are soldered, or otherwise secured, respectively, to the mouth of each of the housings 12 and 13. As the housings or bearings 12, 13, 14 and 15 are exactly alike, a brief description of one will suffice for all four. Referring to Fig. 3, 16 is a locating shoulder near the outer end of the housing for the pipe 11, and 17 is a similar shoulder near the inner end to support the packing washer 18, which washer is compressed against each end of the horizontal pipes 19 and 20 by the threaded cap 21. The ends of these horizontal pipes have a bearing only in the several packing washers located in the housings 12, 13, 14 and 15, and fit tight enough therein to prevent water leaking by the same and yet enable said pipes to be rotated for the purpose to be more fully described. The openings in the several caps as well as in the shoulder 17 of the several housings are considerably larger than the ends of the pipes as a matter of convenience in putting the device together. As the sides of bath tubs are not always straight, it would be a difficult matter to insert one end of the horizontal pipes firmly into the open end of one of the housings and have the opposite end aline with the other housing. For this reason, the ends of said pipes are allowed plenty of freedom with respect to the mouth of the housings and openings in the caps.

Each of the pipes 19, 20 are provided with the small spray holes 22 and the handles 23 secured thereto. These pipes, as before mentioned, are journaled in the washers of the housings and are easily rotated by means of these handles for the purpose of spraying any portion of the body desired, or washing down the sides of the tub, or heating the same by jets of hot water before bathing. These handles are so located with respect to the spray holes, sides and top edge of the tub that any desired range of spray may be had. When the handles are turned down so as to rest against the sides of the tub, the spray will impinge against such sides, and when the pipes are rotated to bring the handles against the upper edge of the tub, the position of the spray holes will be such that the spray will form a shower bath, rising at an angle sufficiently inclined toward the center of the tub as not to allow any water to fall on the outside. Fixing the limit for the outward rotation of the pipes by means of these handles will effectually prevent water being thrown outside of the tub through carelessness, or by children tampering with the pipes.

As the holding pads are all alike, they will be designated by the same figure of reference. Referring to Fig. 4, 24 is a metal cup carrying the rubber or other like washer 25 projecting therefrom and adapted to forcibly rest against the sides of the tub due to frictional contact of the washer heightened by the normal outward spring or expansive force of the pipe connections engaging with the housings 12 and 13. In other words, the pipes 10 and 11 are rigidly connected to the pipes 8 and 9, and the latter rigidly attached to the bulb 4 in such a manner that the branches 10 and 11 will form an obtuse angle with their outer ends out of alinement with the housings 12 and 13, so that these ends will have to be sprung inward to be inserted in said housings. This outward pressure against the pads is exerted practically at the center of said pads by means of the ball bearing 26, Fig. 4, partially seated in the cup 24 and the housing 13, it being understood that housings 12, 14 and 15 are similarly equipped. Each of the housings are secured to the pads by the wires 27.

The nipple 28 at the foot of the tub is shown rigidly attached to the pad, although this, too, could be attached the same as the housings if so desired. The branch pipes 29 and 30 have their inner ends secured to the nipple, and their outer diverging ends are sprung into and secured to the housings 14 and 15 as described for the pipes 10 and 11. These pipes, as well as the pipes 29 and 30, have only a few fine holes, 31, to spray water on the ends of the tub.

The spherical construction of the distributing or mixing bulb 4, when filled, will give an equal flow and pressure of water in the pipes on both sides of the tub which could not readily be effected by any other form. When the spraying device is not used, the tub can be filled by means of the cock 32, Figs. 2 and 5.

It will be understood that the number of holding pads may be increased if desired, the object being simply to provide enough to hold the device firmly in place assisted by the inclined sides of the tub.

The adjustable feature of the device enables it to be fitted to any of the different styles and forms of tubs now in use.

Having thus described my invention, what I claim is:—

1. In a bath tub spraying attachment, the combination with the faucet of a distributing bulb communicating therewith, outwardly projecting branch pipes secured to the bulb, holding pads adapted to contact with the sides of the tub housings attached to the pads, the ends of the branch pipes secured to the housings and adapted to exert an outward pressure against the pads.

2. In a bath tub spraying attachment, branch pipes located at the foot of the tub, a support, a holding pad connected therewith, the inner ends of the branch pipes secured to the support, holding pads located at the sides of the tub, housings connected therewith, the outer ends of the branch pipes sprung into the mouths of the housings and adapted thereby to exert an outward pressure against the pads.

3. In a bath tub spraying device, rigidly secured branch pipes located at the ends of the tub, holding pads resting against the sides of the tub, housings carried by the pads, the ends of the branch pipes forcibly secured to the housings so as to exert pressure against the pads, and horizontal spray pipes rotatably inserted in the housings.

4. In a bath tub spraying device, holding pads resting against the sides of the tub, and means for exerting a holding pressure against said pads.

In testimony whereof I affix my signature in presence of two witnesses.

HENRY BARNES.

Witnesses:
Jos. K. ELLENBOGEN,
BLANCHE J. REDMOND.